United States Patent [19]

Pruis et al.

[11] Patent Number: 5,072,164

[45] Date of Patent: Dec. 10, 1991

[54] ELECTRIC MOTOR CONTROL UNIT

[75] Inventors: Harry Pruis, Morrison; Don Hardey, Dixon, both of Ill.

[73] Assignee: P & P Industries, Inc., Morrison, Ill.

[21] Appl. No.: 640,112

[22] Filed: Jan. 11, 1991

[51] Int. Cl.[5] .................. G05B 5/00

[52] U.S. Cl. .................. 318/468; 318/489; 335/205

[58] Field of Search .................. 318/254, 439, 138, 445, 318/466, 468, 470, 478, 489; D20/1, 9; 335/68, 71, 73, 205

[56] References Cited

U.S. PATENT DOCUMENTS

| | | | |
|---|---|---|---|
| 3,732,509 | 5/1973 | Florant et al. | 335/59 |
| 3,856,387 | 12/1974 | Wray et al. | 352/5 |
| 3,913,129 | 10/1975 | Snyder et al. | 360/6 |
| 3,941,465 | 3/1976 | Figge et al. | 352/130 |
| 4,010,464 | 3/1977 | Wires et al. | 340/347 P |

*Primary Examiner*—William M. Shoop, Jr.
*Assistant Examiner*—David Martin
*Attorney, Agent, or Firm*—Edmond T. Patnaude

[57] ABSTRACT

An electric motor control unit for use in a vending machine includes a sealed housing containing an electric motor drivingly connected through an eccentric and a cam follower to a magnetic switch actuator operatively associated with a sealed, magnetically operated reed switch. Energization of the electric motor rotates an output shaft carrying the eccentric for one cycle of operation, whereupon the motor is deenergized to complete the cycle.

10 Claims, 3 Drawing Sheets

ELECTRIC MOTOR CONTROL UNIT

The present invention relates in general to electric motor controls, and it relates in particular to a unitary drive and control system which is sealed from the atmosphere.

BACKGROUND OF THE INVENTION

Coin-operated vending machines commonly include a product release mechanism including a drive motor which upon actuation by a coin deposited in a slot in the machine drives the release mechanism through one complete cycle of operation. One such type of machine utilizes an open helical coil on which a plurality of packages are hung so that one package is released each time the coil is rotated through three hundred sixty degrees. The motor which drives the coil is controlled by an electric control circuit having several components which are exposed to the ambient. Because such machines are commonly located in damp areas, such drive circuits often require an inordinate amount of maintenance. Moreover, maintenance is sometimes difficult because the circuit components are located in different places and are not easily accessible.

SUMMARY OF THE INVENTION

Briefly, there is provided in accordance with the present invention a self-contained, sealed unit carrying an electric drive motor and a control circuit therefor. The motor rotates an output shaft, which is adapted to be connected to the product release mechanism of a vending machine, through one cycle of operation each time the motor is energized.

In the preferred embodiment of the invention, the sealed unit incorporates an electric motor having power terminals connected directly to a circuit board mounted within the unit. The power terminals of the motor are adapted to be connected to a power source through a terminal connector and the coin operated mechanism via a magnetically operated reed switch also mounted on the circuit board. A cam is mounted to the output shaft of the unit and a cam follower is provided on a pivotable lever carrying an actuator magnet which upon operation of the motor moves the magnet into proximity with the reed switch to hold the switch closed for one revolution of the output shaft and then moves the magnet away from the reed switch which returns to its normally open position and thus deenergizes the motor.

GENERAL DESCRIPTION OF THE DRAWINGS

Further objects and advantages and a better understanding of the present invention will be had from the following detailed description taken in connection with the accompanying drawings wherein.

DETAILED DESCRIPTION OF A PREFERRED EMBODIMENT

Figure 1:
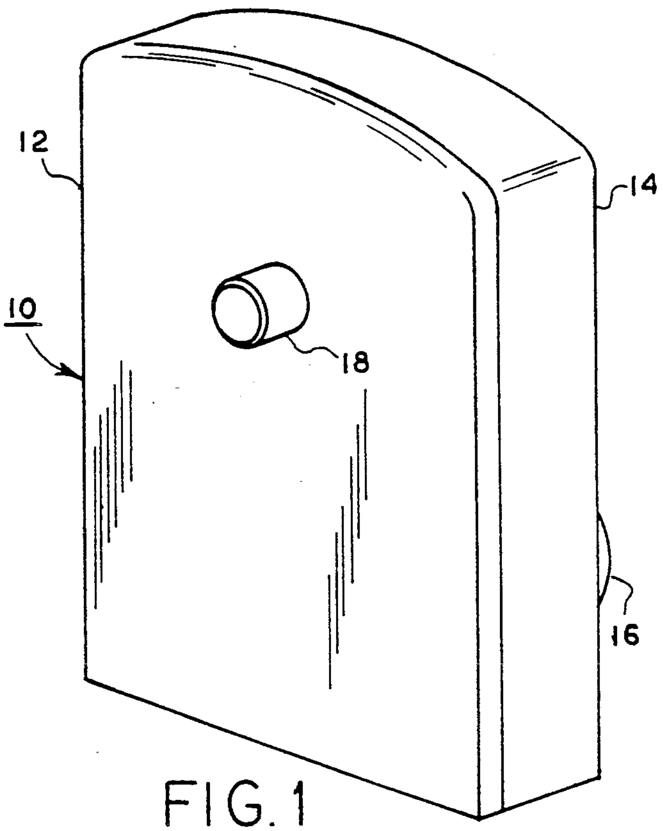
FIG. 1 is an isometric view of a drive and control unit embodying the present invention.

Referring to the drawings and particularly to FIG. 1 thereof, a sealed drive unit 10 includes first and second sealably interconnected housing members 12 and 14 to the rear side of which is mounted an electric motor 16. An output drive shaft 18 is journaled in the housing and extends outwardly from the front side of the unit 10.

Figure 3:
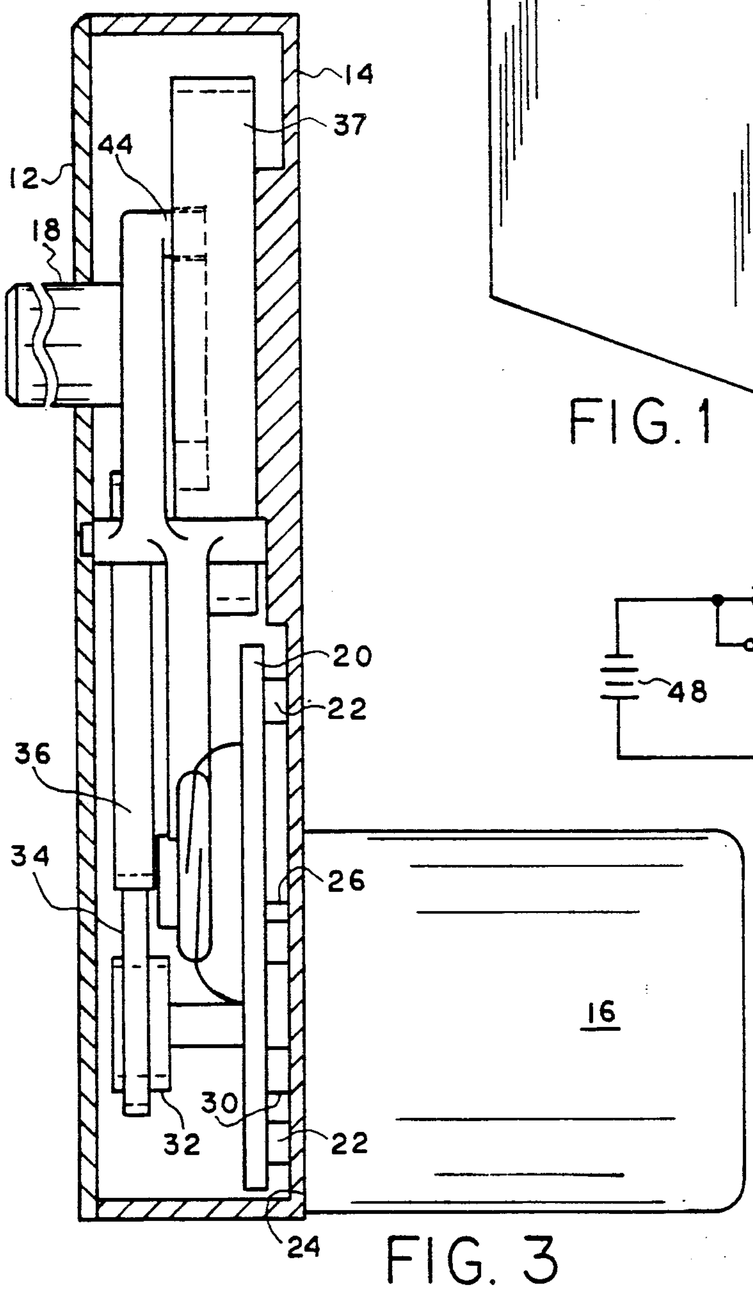
FIG. 3 is a vertically sectioned view taken from the right hand side of FIG. 2.
Figure 2:
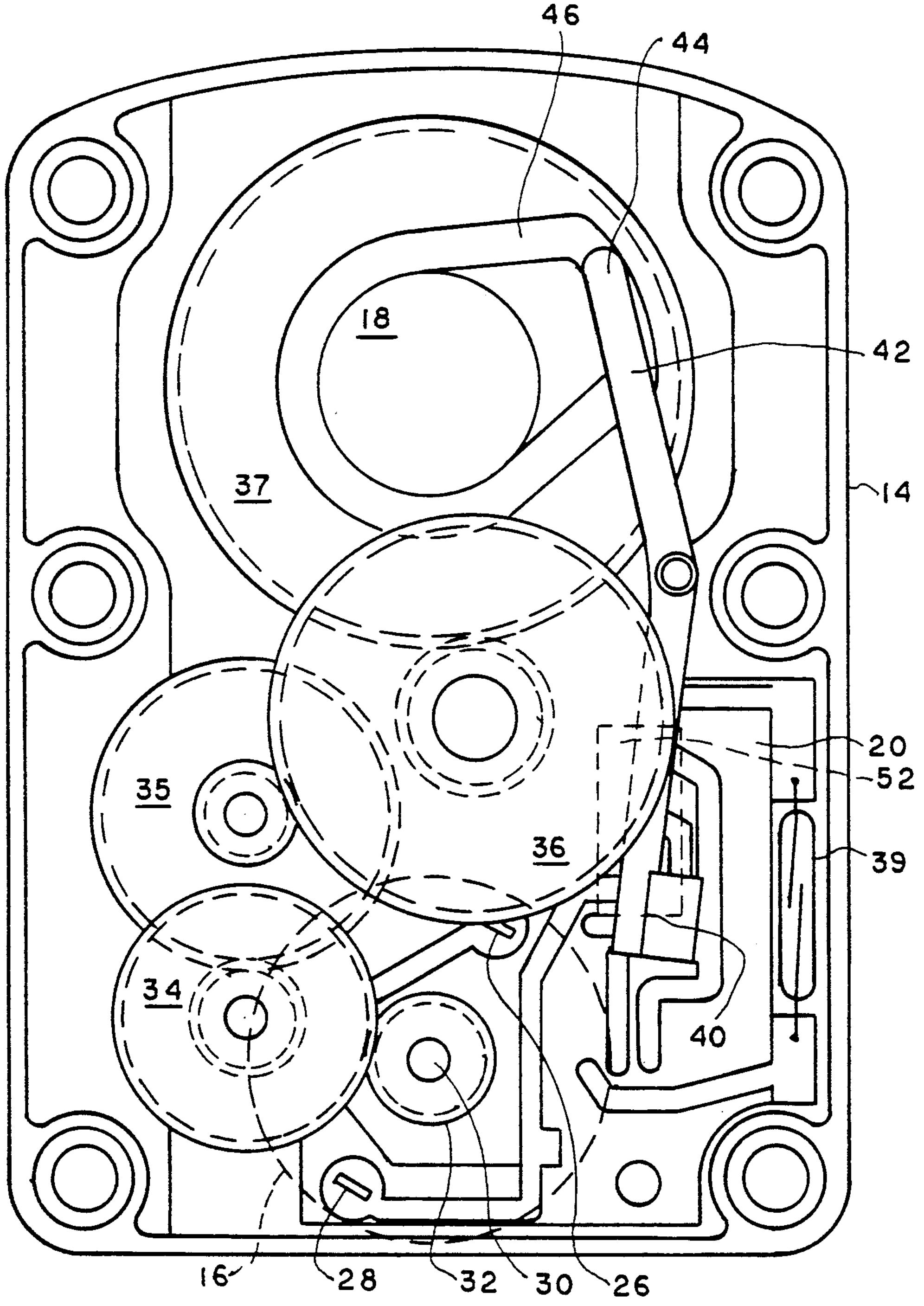
FIG. 2 is an elevational view of the drive and control unit of FIG. 1 with the rear cover removed to show the working parts of the device.

As best shown in FIGS. 2 and 3, a circuit board 20 is suitably mounted to the inside wall of the housing member 14 on a plurality of standoffs 22. The face 24 of the motor 16 is fitted tightly against the rear face of the housing member 14, and a pair of flat power terminals 26 and 28 extend through slotted openings in the wall of the housing member 14 into correspondingly located slots in the circuit board 20. The terminals 26 and 28 are soldered to the circuit board to secure the motor 16 is place against the outer wall of the housing and to make good electric connection to the circuit board.

The shaft 30 of the motor 16 extends through the a complementary hole in the wall of the housing member 14, and a pinion gear 32 is affixed thereto. The speed of the shaft is stepped down by a step-down gear train including additional gears 34, 35, 36 and 37 wherefore the output shaft on which the output gear 37 is mounted rotates through one complete revolution in approximately three seconds.

In accordance with an important feature of the present invention, a magnetically operated reed switch 39 is mounted on the circuit board 20 with one terminal thereof connected to one terminal of the motor 16. A permanent magnet 40 is carried near one end of a first class lever 42 which is pivotably mounted at its center between the housing members 12 and 14 as shown in FIG. 3. A cam follower 44 is provided at the other end of the lever 42 and extends into a continuous cam groove or track 46 provided in the front face of the output gear 37. The reed switch is normally open and the lever is shown in the resting position wherein the magnet 40 is remote from the reed switch and the contacts of the switch are, therefore, open. As the output gear 37 rotates, however, the follower 42 moves closer to the axis of rotation of the gear 37 and thus moves the magnet 40 into proximity with the switch 39 causing the contacts thereof to close. As described hereinafter in connection with FIG. 4, the closed contacts of the reed switch maintain the power circuit to the motor 16 completed until the gear 37 has completed one revolution to return the cam follower 44 to its initial position wherein the magnet is remote from the reed switch 39 to permit the switch 39 to open and deenergize the motor 16.

Figure 4:
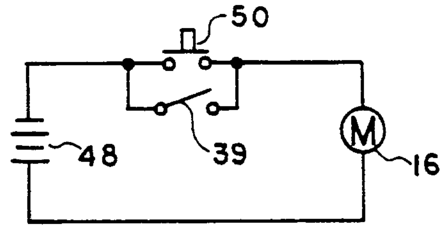
FIG. 4 is a schematic circuit diagram of the control circuit for the drive motor of the control unit of FIG. 1.

Referring to FIG. 4, it will be seen that the reed switch 39 is connected in series with the motor 16 across a source of DC voltage 48. The source 48 may be a battery, but it is preferably a rectifier mounted on the circuit board 20 to permit energizing the unit from a standard public AC power line. Connected in parallel with the reed switch 39 is another switch 50 which is not a part of the unit 10 but is usually a coin operated switch incorporated in the associated vending machine. The switch 50 as well as an external power source is adapted to be connected to the circuit board 20 via a multiple contact connector 52 carried by the board 20 adjacent to an access opening in the wall of the housing member 14.

OPERATION

In use, a control unit 10 is provided for each product drop coil of an associated coin operated vending machine with the output shaft 18 of each unit being connected to one of the drop coils of the machine. A coin operated product select mechanism is electrically connected via the connectors 52 to each of the units 10 such that the associated switch 50 is closed for a few tenths of a second when the associated product is selected and a coin is deposited in the machine. When the switch 50 closes, the motor 16 is energized during the time that the switch 50 remains closed and its shaft 18 operates through the gear train to rotate the gear 37 to position the magnet 40 in proximity to the reed switch 39 causing it to close and complete the power circuit to the motor 16. The switch 50 then opens, and when the gear 37 has completed one revolution, the reed switch 39 opens to deenergize the motor 16. At this time the product support and drop coil has dropped one product piece and has returned to its resting position with another product piece ready to be dropped when the motor 16 is next energized.

Figure 5:
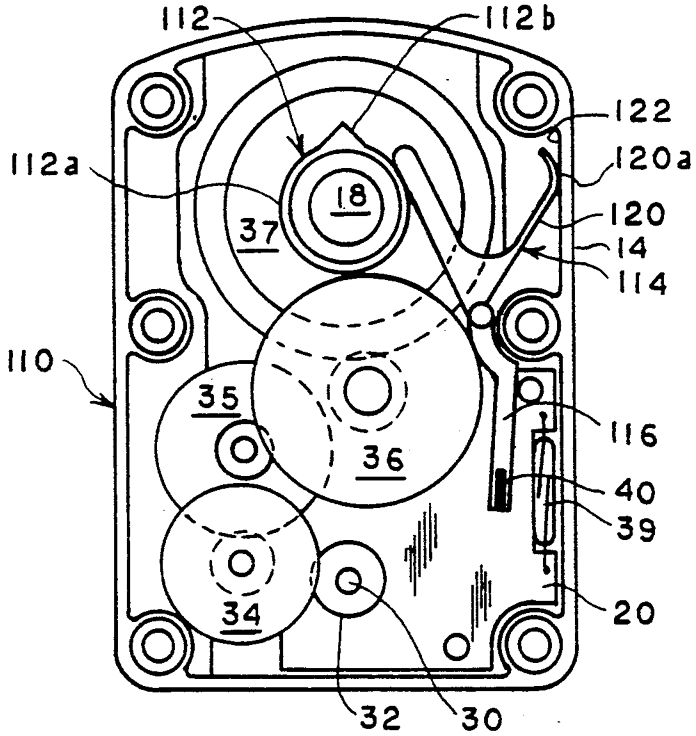
FIG. 5 is an elevational view of a drive and control unit embodying an alternative aspect of the invention.
Figure 6:
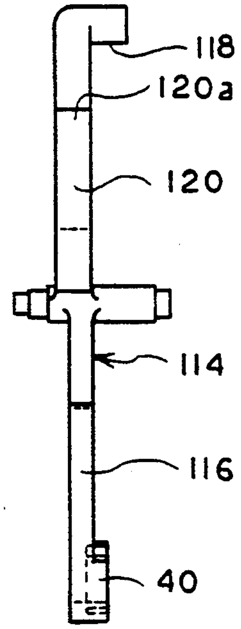
FIG. 6 is a side elevational view of the cam follower and switch actuator used in the embodiment of the invention shown in FIG. 5.

Referring to FIG. 5, there is shown another drive and control unit 110 which is similar in construction to the unit 10 shown in FIG. 1. Accordingly, the same parts used in the units 10 and 110 are identified by the same reference numbers.

In the embodiment of the invention shown in FIG. 5, a cam 112 is mounted to the gear 37 for rotation with the output shaft 18. The cam 112 has an annular surface portion **112*a* and a triangular surface portion 112*b*. The annular surface portion 112*a* has an arcuate length of about three hundred twenty degrees and the triangular portion has an arcuate length of about forty degrees. Moreover, the sides of the portion 112*b* meet the portion 112*a* at a relatively sharp angle. A control lever 114 is pivotally mounted to the case and includes an arm 116 in the lower end of which is mounted the magnet 40 which closes the contacts of the reed switch 39 when moved into proximity therewith. A generally cylindrical cam follower 118 is provided at the upper end of the control lever 114. The control lever 114 further includes an intergal spring arm 120 having a distal end portion 120*a* which engages the inside wall surface 122 of the case member 14 to bias the cam follower 118 into contact with the cam 112**.

When the cam follower 118 is positioned against the cam surface **112*a*, the magnet 40 is remote from the reed switch 39 whereby the normally open contacts thereof are open. When the triangular portion 112*b* engages the cam follower and lifts it away from the shaft 18, the magnet 40 is moved into proximity with the switch 39 to cause the contacts thereof to close. The sharpness of the cam portion 112*b* results in a snap action movement of the magnet 40** resulting in a very fast opening and closing of the switch contacts.

The control lever 114 must be formed of a material which provides the spring arm **120*a* with a high degree of resiliency to maintain the cam follower in contact with the cam surface at all angular positions thereof to insure the quick opening and closing of the switch 39 as the follower 120*a* rides up and down the sides of the triangular portion 112*b*. In one embodiment of the invention the follower rides on the cam portion 112*a* for three hundred miliseconds, and it rides on the portion 112*b* for about fifty miliseconds. It has been found that one suitable material for the control lever 114** is Nylon.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

I claim:

1. A drive and control unit having an output shaft which is rotated through a predetermined angle in response to an electric drive and control signal, comprising in combination a housing, a step down gear train having an input gear and an output gear mounted in said housing, an electric motor mounted to said housing and drivingly connected to said input gear, an electric circuit adapted to be connected between an electric power source and said motor, said circuit including a magnetically operated reed switch mounted in said housing and serially connected with said motor, a cam surface on said output gear, a cam follower positioned against said cam surface, lever means supporting said cam follower and mounted in said housing, and a magnet carried by said lever means for movement between a first position remote from said reed switch and a second switch actuating position in proximity to said reed switch as said output gear and said cam rotate through said perdetermined angle.

2. The drive and control unit according to claim 1, comprising an output shaft on which said output gear is mounted, said output shaft being journalled in said housing, and extending outwardly therefrom.

3. A drive and control unit according to claim 2, comprising a circuit board mounted in said housing, a pair of input terminals extending from one end of said motor, said circuit board having a pair of angularly spaced openings receiving said input terminals, and said motor being disposed with said one end thereof abutting the exterior surface of said housing with said input terminals extending into said housing through a pair of angularly spaced openings in said housing respectively aligned with said openings in said circuit board.

4. A drive and control unit according to claim 3, wherein said lever means is a first class lever with its fulcrum located between said cam follower and said magnet.

5. A drive and control unit according to claim 3, wherein said magnet is a permanent magnet, and said reed switch is normally open.

6. A drive and control unit according to claim 1, comprising spring means urging said cam follower against said cam surface.

7. A drive and control unit according to claim 6, wherein said spring means is an integral part of said lever means.

8. A drive and control unit according to claim 7, wherein said integral part of said lever means is an arm having an outer end portion in abutment with said housing.

9. A drive and control unit according to claim 1, wherein said cam surface is a continuous track on one face of said output gear.

10. A drive and control unit according to claim 1 wherein said housing totally encloses said gear train, said electric circuit including said reed switch, said cam follower, said lever means, and said magnet.

* * * * *